(12) United States Patent
Bian et al.

(10) Patent No.: US 11,644,620 B2
(45) Date of Patent: May 9, 2023

(54) SWITCHABLE POLARIZATION ROTATORS

(71) Applicant: GLOBALFOUNDRIES U.S. Inc., Malta, NY (US)

(72) Inventors: Yusheng Bian, Ballston Lake, NY (US); Steven M. Shank, Jericho, VT (US)

(73) Assignee: GlobalFoundries U.S. Inc., Malta, NY (US)

( * ) Notice: Subject to any disclaimer, the term of this patent is extended or adjusted under 35 U.S.C. 154(b) by 0 days.

(21) Appl. No.: 17/328,048

(22) Filed: May 24, 2021

(65) Prior Publication Data

US 2022/0373738 A1 Nov. 24, 2022

(51) Int. Cl.
*G02B 6/27* (2006.01)
*G02B 6/126* (2006.01)
*G02B 6/122* (2006.01)
*G02B 6/125* (2006.01)

(52) U.S. Cl.
CPC .............. *G02B 6/126* (2013.01); *G02B 6/125* (2013.01); *G02B 6/1228* (2013.01); *G02B 6/276* (2013.01)

(58) Field of Classification Search
CPC ....................................................... G02B 6/276
See application file for complete search history.

(56) References Cited

U.S. PATENT DOCUMENTS

| | | | | |
|---|---|---|---|---|
| 10,178,735 B1* | 1/2019 | Jankovic | ................ | C01G 31/02 |
| 10,641,956 B1 | 5/2020 | Bian et al. | | |
| 10,816,728 B1 | 10/2020 | Bian et al. | | |
| 10,996,398 B1* | 5/2021 | Bian | .................... | G02B 6/2773 |
| 2017/0023735 A1* | 1/2017 | Barwicz | ............... | G02B 6/2773 |
| 2019/0302361 A1* | 10/2019 | Oh | ....................... | G02B 6/2773 |

FOREIGN PATENT DOCUMENTS

| | | | | |
|---|---|---|---|---|
| CN | 105204113 A | | 12/2015 | |
| CN | 105759348 A | * | 7/2016 | ............ G02B 6/105 |
| JP | 3485292 B2 | * | 1/2004 | |
| JP | 4604456 B2 | * | 1/2011 | |
| WO | 2013164655 A1 | | 11/2013 | |

OTHER PUBLICATIONS

JP 4604456 B2 English translation (Year: 2011).*
Steven M. Shank et al., U.S. "Polarization Switches Including a Phase Change Material", filed Feb. 24, 2020 as U.S. Appl. No. 16/799,100.

(Continued)

*Primary Examiner* — Charlie Y Peng
(74) *Attorney, Agent, or Firm* — Thompson Hine LLP; Anthony Canale

(57) ABSTRACT

Structures for a polarization rotator and methods of fabricating a structure for a polarization rotator. The structure includes a substrate, a first waveguide core over the substrate, and a second waveguide core over the substrate. The second waveguide core is positioned proximate to the section of the first waveguide core. The second waveguide core is comprised of a material having a refractive index that is reversibly variable in response to a stimulus.

20 Claims, 7 Drawing Sheets

(56) References Cited

OTHER PUBLICATIONS

Yusheng Bian et al., "Polarizer With Multiple Evanescently Coupled Waveguides", filed Jan. 14, 2020 as U.S. Appl. No. 16/741,792.
Yangyang Liu et al., "Structures for Managing Light Polarization States on a Photonics Chip", filed Oct. 21, 2020 as U.S. Appl. No. 17/076,358.
Wesley D. Sacher, Tymon Barwicz, Benjamin J. F. Taylor, and Joyce K. S. Poon, "Polarization rotator-splitters in standard active silicon photonics platforms," Opt. Express 22, 3777-3786 (2014).
J. D. Sarmiento-Merenguel, R. Halir, X. Le Roux, C. Alonso-Ramos, L. Vivien, P. Cheben, E. Durán-Valdeiglesias, I. Molina-Fernández, D. Marris-Morini, D.-X. Xu, J. H. Schmid, S. Janz, and A. Ortega-Moñux, "Demonstration of integrated polarization control with a 40 dB range in extinction ratio," Optica 2, 1019-1023 (2015).
Liu et al., "An active terahertz polarization converter employing vanadium dioxide and a metal wire grating in total internal reflection geometry", APL Photonics 3, 051604 (2018).
Xu, Q., Chen, L., Wood, M. et al. Electrically tunable optical polarization rotation on a silicon chip using Berry's phase. Nat Commun 5, 5337 (2014).
K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611.
M. Rakowski, et al., "45nm CMOS—Silicon Photonics Monolithic Technology (45CLO) for next-generation, low power and high speed optical interconnects," in Optical Fiber Communication Conference (OFC) 2020, OSA Technical Digest (Optical Society of America, 2020), paper T3H.3.
Y. Bian, et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optical Society of America, 2020), paper FW5D.2.
Bian et al., "Hybrid vanadate waveguiding configurations for extreme optical confinement and efficient polarization management in the near-infrared", Nanoscale, 2018,10, 16667-16674.
Son et al., "Nanosecond polarization modulation in vanadium dioxide thin films", Appl. Phys. Lett. 111, 041103 (2017).

\* cited by examiner

SWITCHABLE POLARIZATION ROTATORS

BACKGROUND

The present invention relates to photonics chips and, more specifically, to structures for a polarization rotator and methods of fabricating a structure for a polarization rotator.

Photonics chips are used in many applications and systems including, but not limited to, data communication systems and data computation systems. A photonics chip integrates optical components, such as waveguides, optical switches, and directional couplers, and electronic components, such as field-effect transistors, into a unified platform. Among other factors, layout area, cost, and operational overhead may be reduced by the integration of both types of components on the same chip.

Polarization rotators are another type of optical component commonly found in photonics chips. A polarization rotator may be configured to receive optical signals of a given polarization state (e.g., the fundamental transverse magnetic (TM0) mode) as input and to output a different polarization state (e.g., the fundamental transverse electric (TE0) mode). Polarization rotators are passive optical components having an optical performance that cannot be tuned, switched, or otherwise configured.

Improved structures for a polarization rotator and methods of fabricating a structure for a polarization rotator are needed.

SUMMARY

In an embodiment of the invention, a structure for a polarization rotator is provided. The structure includes a substrate, a first waveguide core over the substrate, and a second waveguide core over the substrate. The second waveguide core is positioned proximate to the section of the first waveguide core. The second waveguide core is comprised of a material having a refractive index that is reversibly variable in response to a stimulus.

In an embodiment of the invention, a method of forming a structure for a polarization rotator is provided. The method includes forming a first waveguide core over a substrate, and forming a second waveguide core over the substrate. The second waveguide core is positioned proximate to a section of the first waveguide core, and the second waveguide core is comprised of a material having a refractive index that is reversibly variable in response to a stimulus.

BRIEF DESCRIPTION OF THE DRAWINGS

The accompanying drawings, which are incorporated in and constitute a part of this specification, illustrate various embodiments of the invention and, together with a general description of the invent ion given above and the detailed description of the embodiments given below, serve to explain the embodiments of the invention. In the drawings, like reference numerals refer to like features in the various views.

DETAILED DESCRIPTION

Figure 1:
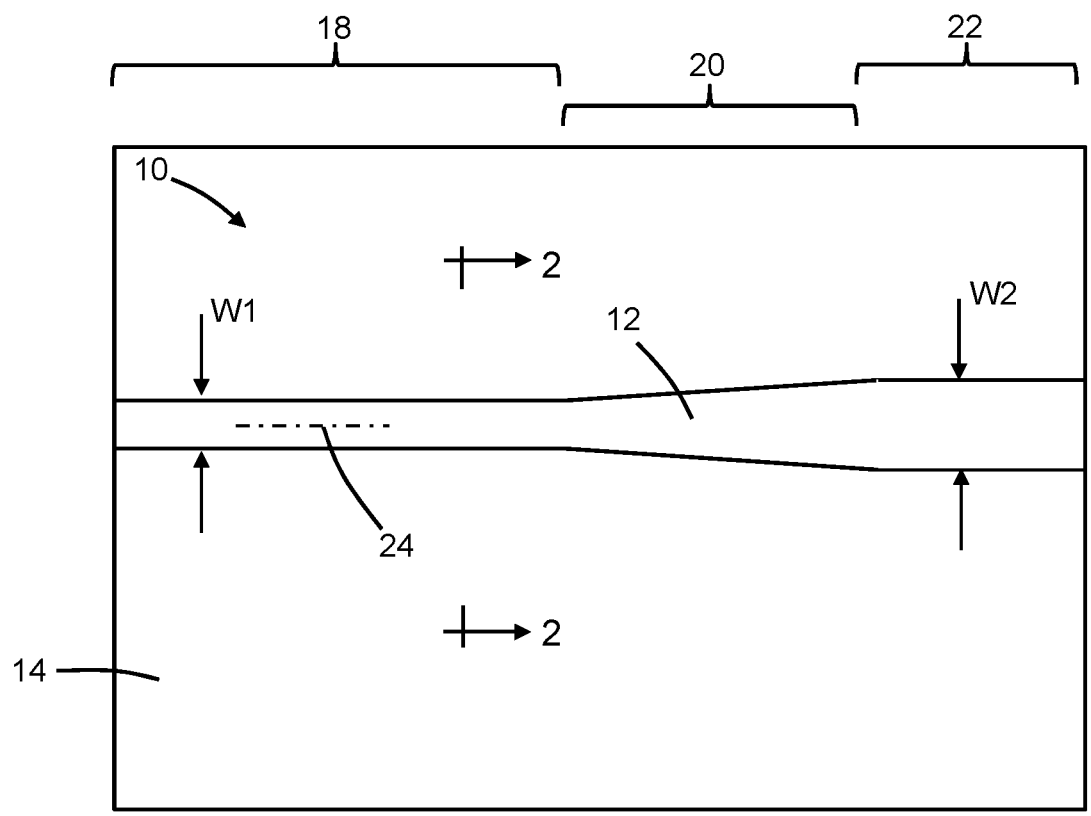
FIG. 1 is a top view of a structure at an initial fabrication stage of a processing method in accordance with embodiments of the invention.
Figure 2:
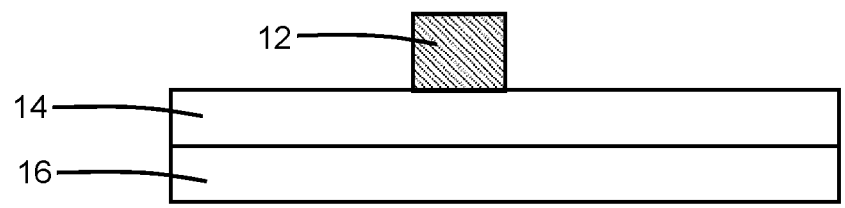
FIG. 2 is a cross-sectional view of the structure taken generally along line 2-2 in FIG. 1.

With reference to FIGS. 1, 2 and in accordance with embodiments of the invention, a structure 10 for a switchable polarization rotator includes a waveguide core 12 that is positioned on a dielectric layer 14 and over a substrate 16. The waveguide core 12 may be comprised of a semiconductor material, such as single-crystal silicon from a device layer of a silicon-on-insulator (SOI) wafer. The silicon-on-insulator wafer further includes a buried insulator layer comprised of a dielectric material, such as silicon dioxide, that provides the dielectric layer 14, and the substrate 16 may be comprised of a semiconductor material, such as single-crystal silicon. The waveguide core 12 may be patterned from the device layer of the silicon-on-insulator wafer by lithography and etching processes during front-end-of-line processing. The device layer of the silicon-on-insulator wafer may be fully etched to define a ridge waveguide as shown or, alternatively, only partially etched near the waveguide core 12 to define a rib waveguide.

The waveguide core 12 includes a section 18, a section 20, and a section 22 that are serially adjoined and connected with alignment along a longitudinal axis 24. The section 20 is arranged between the section 18 and the section 22. The section 20 inversely tapers (i.e., widens) in a direction from the section 18 to the section 22 and, conversely, tapers (i.e., narrows) in a direction from the section 22 to the section 18. The direction of widening may be the direction of light propagation through the structure 10. The section 20 may intersect the section 18 at one end and intersect the section 22 at its opposite end. The width of the section 20 changes over its length from a width W1 at its intersection with section 18 to a width W2 at its intersection with section 22. In an embodiment, the width W2 is greater than the width W1. In an embodiment, the sections 18 and 22 may be non-tapered or straight. The section 18 may have the width W1 over the portion of its length adjacent to the section 20, and the section 22 may have the width W2 over the portion of its length adjacent to the section 20.

Figure 3:
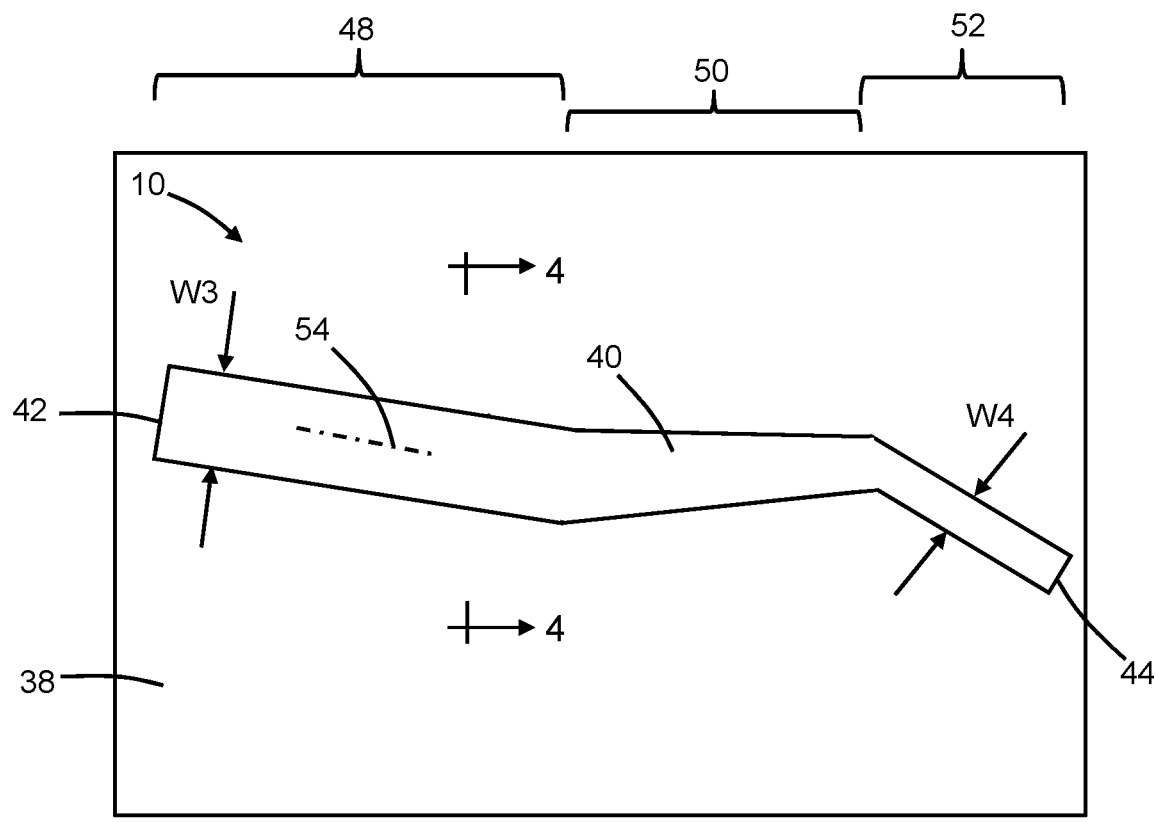
FIG. 3 is a top view of the structure at a fabrication stage subsequent to FIG. 1.
Figure 4:
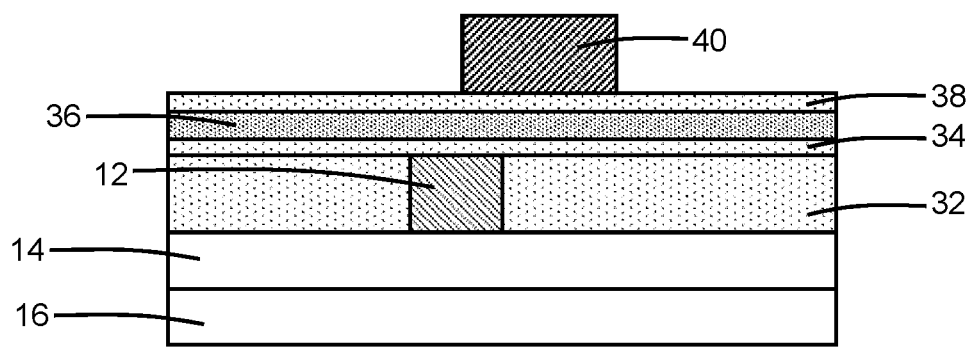
FIG. 4 is a cross-sectional view of the structure taken generally along line 4-4 in FIG. 3.

With reference to FIGS. 3, 4 in which like reference numerals refer to like features in FIGS. 1, 2 and at a subsequent fabrication stage, a dielectric layer 32 is formed over the waveguide core 12. The dielectric layer 32 may be comprised of a dielectric material, such as silicon dioxide, deposited by chemical vapor deposition and planarized by, for example, chemical-mechanical polishing to remove topography and provide a planar surface of subsequent depositions. The waveguide core 12 is arranged in the dielectric material of the dielectric layer 32, which operates as low-index cladding.

Additional dielectric layers 34, 36, 38 may be formed on the dielectric layer 32. The dielectric layer 34 and the dielectric layer 38 may be comprised of silicon dioxide, and the dielectric layer 36 may be comprised of silicon nitride. In an embodiment, the dielectric layer 36 may be omitted from the layer stack.

A waveguide core 40 may be positioned over substrate 16 on the dielectric layer 38. The waveguide core 40 may be formed by depositing a layer on the dielectric layer 38 and patterning the deposited layer with lithography and etching processes. To that end, an etch mask is formed by a lithography process over the deposited layer, and unmasked sections of the deposited layer are etched and removed with an etching process, such as reactive ion etching. The shape of the etch mask determines the patterned shape of the waveguide core 40. The etching process may be selected to stop on the material of the dielectric layer 38 after penetrating fully through the deposited layer.

In an embodiment, the waveguide core 40 may be comprised of an active material having an index of refraction (i.e., refractive index) that can be tuned (i.e., switched) by the application of a stimulus, such as an electrical, optical or thermal stimulus. In an embodiment, the waveguide core 40 may be comprised of a material characterized by a refractive index that is reversibly variable by the stimulus among different states characterized by significantly different refractive indices and optical absorption properties. In an embodiment, the refractive index of the active material may exhibit multiple different states in which the real parts and the imaginary parts are significantly different. For example, the refractive index of the active material may have a higher real part and a lower imaginary part in one state than in another state. In embodiments, the stimulus used to prompt the reversible variation between the different refractive index states may be heat from a resistive heater that supplies a temperature change, an electric field supplied by an applied voltage, an electrical current supplied by an applied voltage, or optical pumping by pump light supplied from an external laser.

In an embodiment, the active material contained in the waveguide core 40 may be a conducting oxide, such as indium-tin oxide for which the real part and imaginary part of its refractive index may respectively be equal to about 2 and about zero in one tuned state, and the real part and imaginary part of its refractive index may respectively be equal to about 1 and about 0.3 in another tuned state. In an embodiment, the active material contained in the waveguide core 40 may be a phase change material, such as vanadium oxide or germanium-antimony telluride. For example, vanadium oxide undergoes a reversible metal-insulator phase change between its metallic and insulating states near a temperature of 68° C. In an embodiment, the active material contained in the waveguide core 40 may be a two-dimensional material, such as graphene or molybdenum disulphide. In an embodiment, the active material contained in the waveguide core 40 may be an electro-optic polymer.

The waveguide core 40 is positioned proximate to the waveguide core 12 and is vertically displaced from the waveguide core 12. The waveguide core 40 is located in a different level within the structure 10 than the waveguide core 12. In that regard, the waveguide core 12 is positioned in a level between a level containing the substrate 16 and a level containing the waveguide core 40. The proximity of the waveguide core 40 to the waveguide core 12 provides a spatial closeness that is sufficient to deliver the switching behavior through light absorption.

The waveguide core 40 includes a section 48, a section 50, and a section 52 that are serially adjoined and connected with alignment along a longitudinal axis 54 that changes direction in the different sections 48, 50, 52. In an embodiment, the section 48 of the waveguide core 40 may be positioned in an overlapping arrangement with the section 18 of the waveguide core 12, and the section 50 of the waveguide core 40 may be positioned in an overlapping arrangement with the section 20 of the waveguide core 12. The section 50 is arranged between the sections 48 and 52. The section 50 tapers (i.e., narrows) in a direction from the section 48 to the section 52 and, conversely, inversely tapers (i.e., widens) in a direction from the section 52 to the section 48. The section 50 may intersect the section 48 at one end and intersect the section 52 at its opposite end. The width of the section 50 changes over its length from a width W3 at its intersection with section 48 to a width W4 at its intersection with section 52. In an embodiment, the width W4 is greater than the width W3. In an embodiment, the sections 48 and 52 may be non-tapered or straight. The section 48 may have the width W3 over the portion of its length adjacent to the section 50, and the section 52 may have the width W4 over the portion of its length adjacent to the section 50.

The waveguide core 40 may be terminated at an end 42 and terminated at an end 44 opposite to the end 42. The section 48 of the waveguide core 40 may extend from the end 42 at an angle relative to the waveguide core 12, and the section 48 may be positioned to overlap with the section 18 of the waveguide core 12. The section 50 of the waveguide core 40 may be arranged to partially overlap with the waveguide core 12, and may be positioned primarily over the section 20 of the waveguide core 12. The section 52 of the waveguide core 40 may be angled to diverge away from the waveguide core 12 and may terminate at the end 44.

In an alternative embodiment, waveguide core 40 may be shaped with adiabatic bends. As used herein, an adiabatic bend includes gradual changes in direction such that optical signals may propagate without a significant reduction in light confinement.

Figure 5:
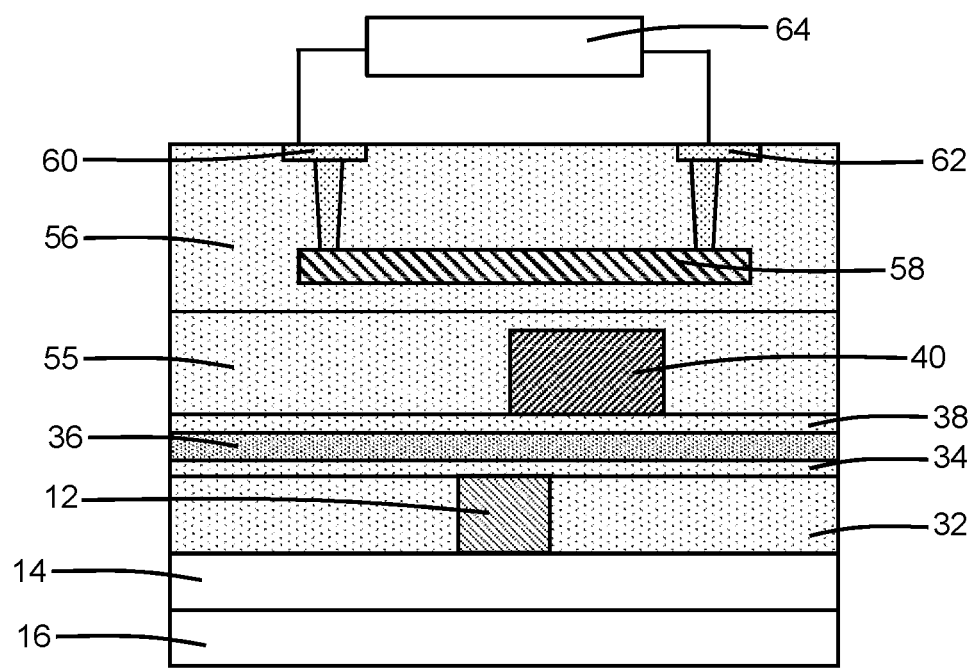
FIG. 5 is a cross-sectional view of the structure at a fabrication stage subsequent to FIGS. 3, 4.

With reference to FIG. 5 in which like reference numerals refer to like features in FIG. 4 and at a subsequent fabrication stage, a dielectric layer 55 may be formed over the dielectric layer 38 and the waveguide core 40. The dielectric layer 55 may be comprised of dielectric material, such as silicon dioxide, deposited by chemical vapor deposition or atomic layer deposition. In an embodiment, the dielectric layer 55 may be comprised of a dielectric material, such as silicon dioxide, deposited by chemical vapor deposition using tetraethylorthosilicate (TEOS) as a reactant.

A back-end-of-line stack 56 may be formed by back-end-of-line processing over the dielectric layer 55. The back-end-of-line stack 56 may include one or more dielectric layers comprised of a dielectric material, such as silicon dioxide or a low-k dielectric material.

In an embodiment, a heater 58 may be positioned proximate to the waveguide core 40. In the representative embodiment, the heater 58 is positioned in the back-end-of-line stack 56 proximate to the waveguide core 40. The proximity of the heater 58 to the waveguide core 40 is spatial closeness that is sufficient to provide the stimulus for the refractive index change of the active material of the waveguide core 40 through temperature changes.

The heater 58 may be comprised of a metal, such as nickel-chromium, tantalum nitride or titanium nitride, that is deposited and patterned. The heater 58 may be coupled by metal features 60, 62 in the back-end-of-line stack 56 with a power supply 64 for powering the heater 58 to provide a temperature change prompting the refractive index change of the active material of the waveguide core 40. During operation, heat is transferred from the powered heater 58 through the dielectric material of the back-end-of-line stack 56 to the waveguide core 40. The temperature of the waveguide core 40 may be varied above and below the state transition temperature by the selective application of heat as the stimulus to provide the different refractive indices.

In use, optical signals propagating with a transverse magnetic (TM) mode may be guided on the photonics chip by the waveguide core 12 for input to the structure 10. When the active material of the waveguide core 40 is tuned (e.g., by a temperature less than a phase change transition temperature) to one refractive index state, the waveguide cores 12, 40 cooperate to rotate the polarization mode of the light embodied in the optical signals from the TM mode to the transverse electric (TE) mode, which is output from the structure 10. In particular, the overlapping arrangement of the section 18 of the waveguide core 12 and the section 48 of the waveguide core 40 and/or the overlapping arrangement of the section 20 of the waveguide core 12 and the section 50 of the waveguide core 40 may provide a polarization in which the polarization mode of the light is rotated. Depending on the length of the waveguide cores 12, 40, the light exiting from the structure 10 may be polarized to only include light of the TE mode or, alternatively, may include a polarization mixture including light containing a TE mode component and light containing a TM mode component. When the active material of the waveguide core 40 is tuned (e.g., by a temperature greater than a phase change transition temperature) to another refractive index state, the waveguide core 40 may effectively block light transmission through the structure 10 by absorbing and dissipating the input optical signals and, thereby, provide light switching.

The structure 10, in any of its embodiments described herein, may be integrated into a photonics chip that includes electronic components and additional optical components. For example, the electronic components may include field-effect transistors that are fabricated by CMOS front-end-of-line (FEOL) processing.

Figure 6:
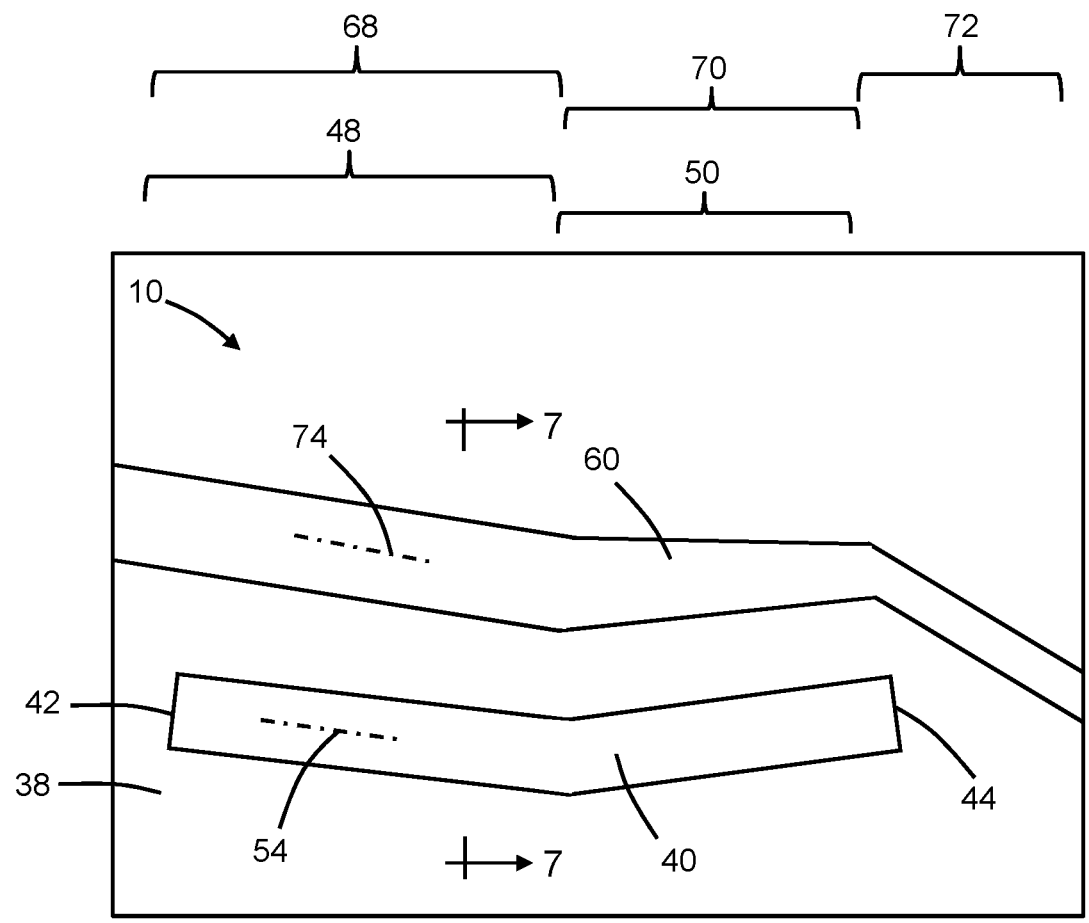
FIG. 6 is a top view of a structure in accordance with alternative embodiments of the invention.
Figure 7:
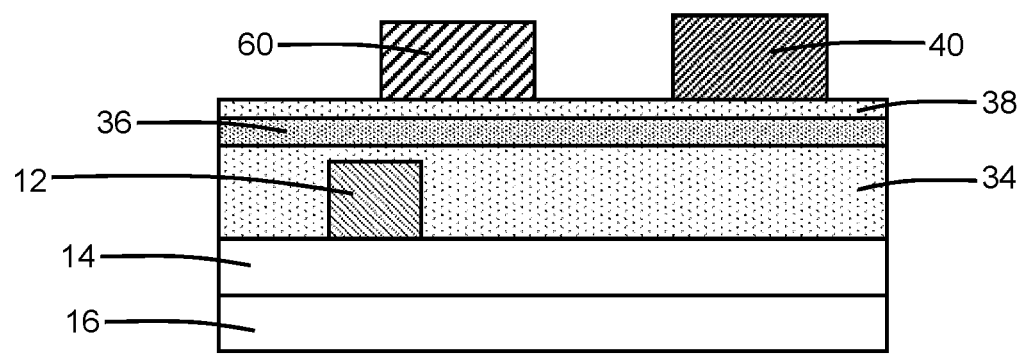
FIG. 7 is a cross-sectional view of the structure taken generally along line 7-7 in FIG. 6.

With reference to FIGS. 6, 7 and in accordance with alternative embodiments of the invention, a waveguide core 60 may be positioned over the substrate 16 in an overlapping relationship with the waveguide core 12, and the waveguide core 40 may be laterally offset to be positioned in a non-overlapping relationship with the waveguide core 12. The waveguide core 60 may be positioned proximate to the waveguide core 40 and in the same level within the structure 10. As a result, both waveguide cores 40, 60 are located in a different level within the structure 10 than the waveguide core 12. In that regard, the waveguide core 12 is positioned in a level between a level containing the substrate 16 and a level containing the waveguide cores 40, 60.

The waveguide core 60 may be formed by depositing a layer on the dielectric layer 38 and patterning the deposited layer with lithography and etching processes. To that end, an etch mask is formed by a lithography process over the deposited layer, and unmasked sections of the deposited layer are etched and removed with an etching process, such as reactive ion etching. The shape of the etch mask determines the patterned shape of the waveguide core 60. The etching process may be selected to stop on the material of the dielectric layer 38 after penetrating fully through the deposited layer. In an embodiment, the waveguide core 60 may be comprised of a dielectric material, such as silicon nitride. In an alternative embodiment, the waveguide core 60 may be comprised of polysilicon. The waveguide core 60 may be masked during the formation of the waveguide core 40.

The waveguide core 60 includes a section 68, a section 70, and a section 72 that are serially adjoined and connected with alignment along a longitudinal axis 74 that changes direction in the different sections 68, 70, 72. The section 70 is arranged between the sections 68 and 72. The section 70 tapers (i.e., narrows) in a direction from the section 68 to the section 72 and, conversely, inversely tapers (i.e., widens) in a direction from the section 72 to the section 68. The section 70 may intersect the section 68 at one end and intersect the section 72 at its opposite end. The width of the section 70 narrows over its length from its intersection with section 68 to its intersection with section 72. In an embodiment, the sections 68 and 72 may be non-tapered or straight.

The waveguide core 60 may be vertically displaced from the waveguide core 12 and laterally displaced from the waveguide core 40. In the representative embodiment, the section 68 of the waveguide core 60 may be positioned in an overlapping arrangement with the section 18 of the waveguide core 12, and the section 70 of the waveguide core 60 may be positioned in an overlapping arrangement with the section 20 of the waveguide core 12. The section 68 of the waveguide core 60 may be inclined at an angle relative to the waveguide core 12. The section 72 of the waveguide core 60 may be inclined at an angle to diverge away from the waveguide core 12.

The waveguide core 40 includes the section 48 that is laterally offset from the section 68 of the waveguide core 60, and the section 50 that is laterally offset from the section 70 of the waveguide core 60. The sections 48, 50 are angled relative to each other, and section 50 may be non-tapered. The longitudinal axis 54 of section 48 of the waveguide core 40 may be aligned parallel or substantially parallel to the longitudinal axis 74 of section 68 the waveguide core 60 such that the section 48 and the section 68 are inclined at either the same angle or substantially the same angle relative to the section 18 of the waveguide core 12. The longitudinal axis 54 of section 50 of the waveguide core 40 may be aligned parallel or substantially parallel to the longitudinal axis 74 of section 70 the waveguide core 60 such that the section 50 and the section 70 are inclined at either the same angle or substantially the same angle relative to the section 20 of the waveguide core 12.

In an alternative embodiment, waveguide core 60 may be shaped with adiabatic bends. As used herein, an adiabatic bend includes gradual changes in direction such that optical signals may propagate without a significant reduction in light confinement.

In use, when the active material of the waveguide core 40 is tuned (e.g., by a temperature less than a phase change transition temperature) to one refractive index state, the waveguide cores 12, 60 cooperate to rotate the polarization mode of the light embodied in the optical signals from the TM mode to the transverse electric (TE) mode, which is output from the structure 10. In particular, the overlapping arrangement of the section 18 of the waveguide core 12 and the section 68 of the waveguide core 60 and/or the overlapping arrangement of the section 20 of the waveguide core 12 and the section 70 of the waveguide core 60 may provide a polarization region in which the polarization mode of the light is rotated. Depending on the length of the waveguide cores 12, 60, the light exiting from the structure 10 may be polarized to only include light of the TE mode or, alternatively, may include a polarization mixture including light containing a TE mode component and light containing a TM mode component. When the active material of the waveguide core 40 is tuned (e.g., by a temperature greater than a phase change transition temperature) to another refractive index state, the waveguide core 40 may effectively block light transmission through the structure 10 by absorbing and dissipating the input optical signals and, thereby, provide light switching.

Figure 8:
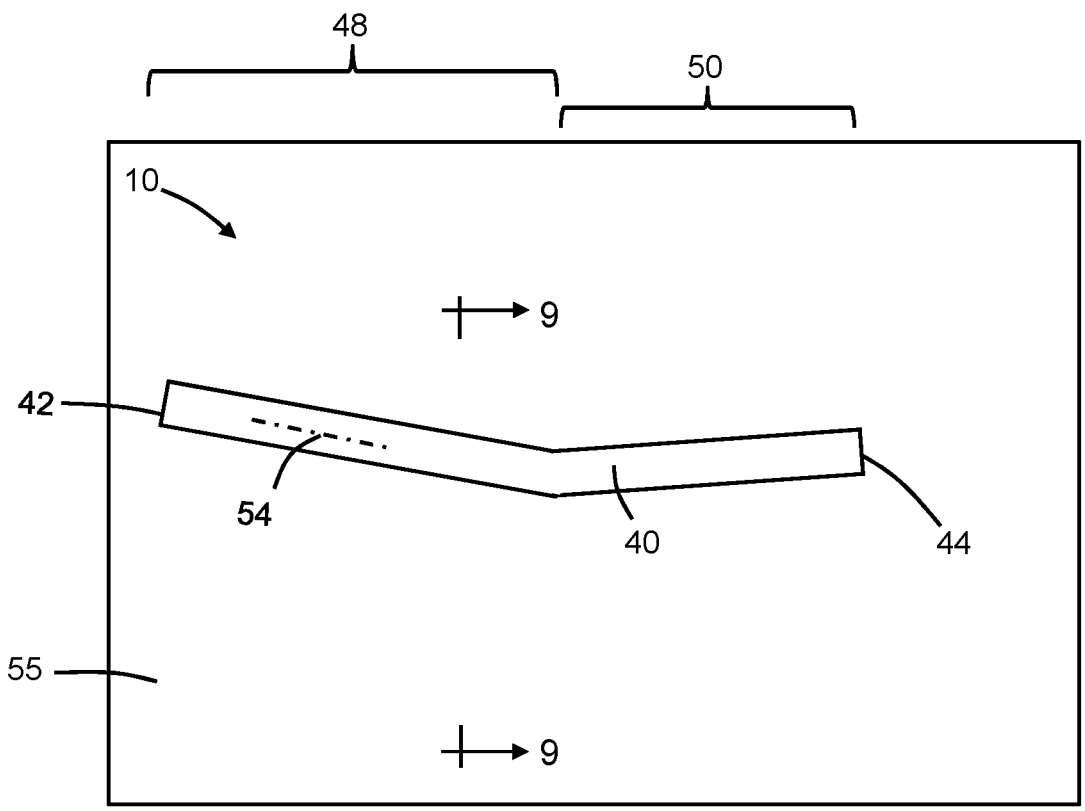
FIG. 8 is a top view of a structure in accordance with alternative embodiments of the invention.
Figure 9:
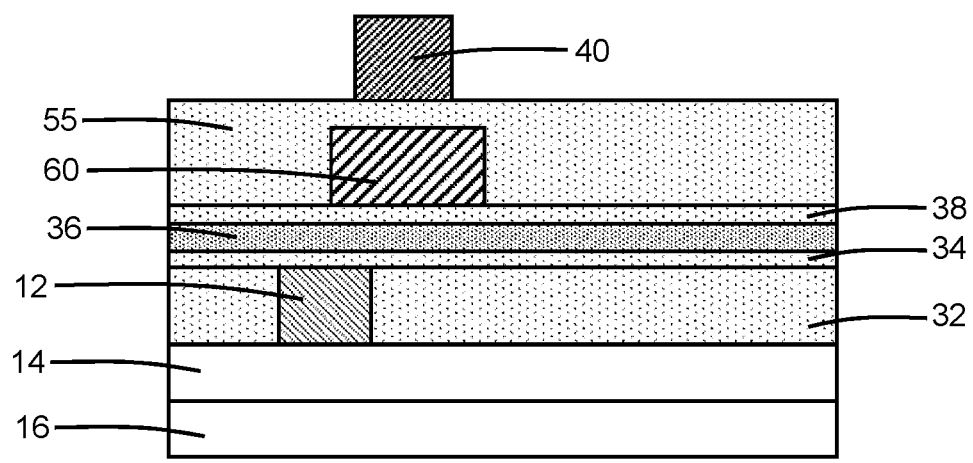
FIG. 9 is a cross-sectional view of the structure taken generally along line 9-9 in FIG. 8.

With reference to FIGS. 8, 9 and in accordance with alternative embodiments of the invention, the waveguide core 40 may be vertically displaced from the waveguide core 60 and may be positioned to have an overlapping relationship with the waveguide core 60. In that regard, the waveguide core 40 may be positioned in a different level than waveguide core 60 within the structure 10. As a result, each of the waveguide cores 12, 40, 60 is located in a different level within the structure 10 with the waveguide core 60 positioned in a vertical direction between the waveguide core 40 and the waveguide core 12.

In use, when the active material of the waveguide core 40 is tuned (e.g., by a temperature less than a phase change transition temperature) to one refractive index state, the waveguide cores 12, 60 cooperate to rotate the polarization mode of the light embodied in the optical signals from the TM mode to the transverse electric (TE) mode, which is output from the structure 10. In particular, the overlapping arrangement of the section 18 of the waveguide core 12 and the section 68 of the waveguide core 60 and/or the overlapping arrangement of the section 20 of the waveguide core 12 and the section 70 of the waveguide core 60 may provide a polarization region in which the polarization mode of the light is rotated. Depending on the length of the waveguide cores 12, 60, the light exiting from the structure 10 may be polarized to only include light of the TE mode or, alternatively, may include a polarization mixture including light containing a TE mode component and light containing a TM mode component. When the active material of the waveguide core 40 is tuned (e.g., by a temperature greater than a phase change transition temperature) to another refractive index state, the waveguide core 40 may effectively block light transmission through the structure 10 by absorbing and dissipating the input optical signals and, thereby, provide light switching.

Figure 10:
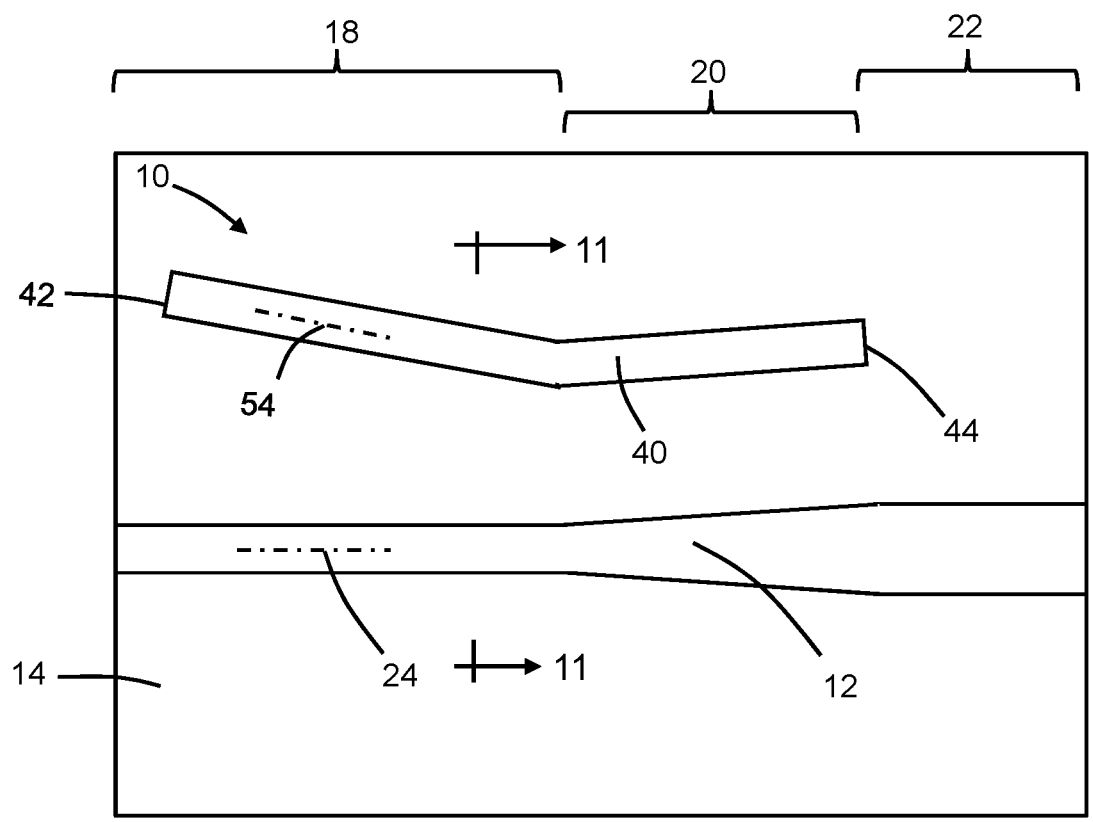
FIG. 10 is a top view of a structure in accordance with alternative embodiments of the invention.
Figure 11:
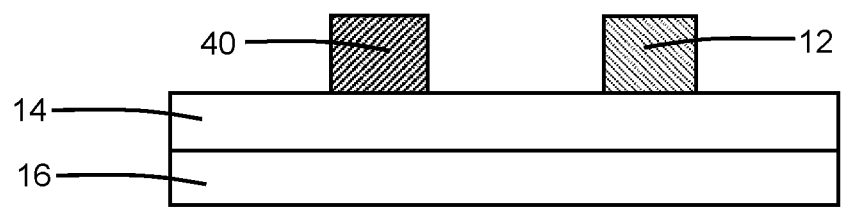
FIG. 11 is a cross-sectional view of the structure taken generally along line 11-11 in FIG. 10.

With reference to FIGS. 10, 11 and in accordance with alternative embodiments of the invention, the waveguide core 40 may be laterally displaced from the waveguide core 12 and positioned proximate to the waveguide core 12 in a juxtaposed and non-overlapping relationship, as well as in the same level of the structure 10 as the waveguide core 12.

Figure 12:
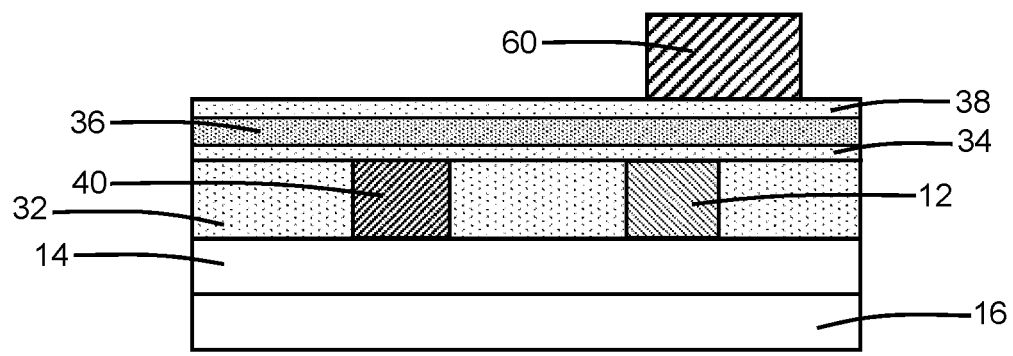
FIG. 12 is a cross-sectional view of the structure at a fabrication stage subsequent to FIGS. 10, 11.

With reference to FIG. 12 in which like reference numerals refer to like features in FIGS. 10, 11 and at a subsequent fabrication stage, the dielectric layers 34, 36, 38 may be formed over the waveguide cores 12, 40, and the waveguide core 60 may be formed on the dielectric layer 38 in a different level than the waveguide cores 12, 40. The waveguide core 60 may be vertically displaced from the waveguide core 12 and positioned in an overlapping arrangement with the waveguide core 12.

In use, when the active material of the waveguide core 40 is tuned (e.g., by a temperature less than a phase change transition temperature) to one refractive index state, the waveguide cores 12, 60 cooperate to rotate the polarization mode of the light embodied in the optical signals from the TM mode to the transverse electric (TE) mode, which is output from the structure 10. In particular, the overlapping arrangement of the section 18 of the waveguide core 12 and the section 68 of the waveguide core 60 and/or the overlapping arrangement of the section 20 of the waveguide core 12 and the section 70 of the waveguide core 60 may provide a polarization region in which the polarization mode of the light is rotated. Depending on the length of the waveguide cores 12, 60, the light exiting from the structure 10 may be polarized to only include light of the TE mode or, alternatively, may include a polarization mixture including light containing a TE mode component and light containing a TM mode component. When the active material of the waveguide core 40 is tuned (e.g., by a temperature greater than a phase change transition temperature) to another refractive index state, the waveguide core 40 may effectively block light transmission through the structure 10 by absorbing and dissipating the input optical signals and, thereby, provide light switching.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may "overlap" if a feature extends over, and covers a part of, another feature with either direct contact or indirect contact.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for a polarization rotator, the structure comprising:
    a substrate;
    a first waveguide core over the substrate, the first waveguide core including a section;
    a second waveguide core over the substrate, the second waveguide core positioned proximate to the section of the first waveguide core, and the second waveguide core vertically displaced from the first waveguide core; and
    a third waveguide core vertically displaced from the first waveguide core, the third waveguide core including a section positioned in an overlapping relationship with the section of the first waveguide core,
    wherein the second waveguide core comprises a first material having a refractive index that is reversibly variable in response to a stimulus, the first waveguide core comprises a second material different from the first material, and the third waveguide core comprises a third material different from the first material and different from the second material.

2. The structure of claim 1 wherein the section of the third waveguide core and the section of the first waveguide core define a polarization region configured to rotate a polarization mode of light, and the second waveguide core is configured to absorb the light when the stimulus is applied to the first material.

3. The structure of claim 1 wherein the second waveguide core is positioned in an overlapping relationship with the third waveguide core, and the third waveguide core is positioned in a vertical direction between the first waveguide core and the second waveguide core.

4. The structure of claim 1 wherein the first material comprises a conducting oxide, a phase change material, a two-dimensional material, or an electro-optic polymer.

5. The structure of claim 1 further comprising:
    a heater proximate to the second waveguide core, the heater configured to selectively transfer heat as the stimulus to the second waveguide core.

6. The structure of claim 1 wherein the second material comprises single-crystal silicon, and the third material comprises silicon nitride.

7. The structure of claim 1 wherein the second material comprises single-crystal silicon, and the third material comprises polysilicon.

8. A structure for a polarization rotator, the structure comprising:
    a substrate;
    a first waveguide core over the substrate, the first waveguide core including a section;
    a second waveguide core over the substrate, the second waveguide core positioned proximate to the section of the first waveguide core, and the second waveguide core laterally displaced from the first waveguide core in a non-overlapping relationship; and
    a third waveguide core vertically displaced from the first waveguide core, the third waveguide core including a section positioned in an overlapping relationship with the section of the first waveguide core,
    wherein the second waveguide core comprises a first material having a refractive index that is reversibly variable in response to a stimulus, the first waveguide core comprises a second material different from the first material, and the third waveguide core comprises a third material different from the first material and different from the second material.

9. The structure of claim 8 wherein the section of the third waveguide core and the section of the first waveguide core define a polarization region configured to rotate a polarization mode of light, and the second waveguide core is configured to absorb the light when the stimulus is applied to the first material.

10. The structure of claim 8 wherein the second waveguide core is positioned adjacent to the third waveguide core.

11. The structure of claim 8 wherein the third waveguide core includes a tapered section positioned in an overlapping relationship with the section of the first waveguide core.

12. The structure of claim 11 wherein the section of the third waveguide core and the section of the first waveguide core define a polarization region configured to rotate a polarization mode of light, and the second waveguide core is configured to absorb the light when the stimulus is applied to the first material.

13. The structure of claim 8 further comprising:
    a heater proximate to the second waveguide core, the heater configured to selectively transfer heat as the stimulus to the second waveguide core.

14. The structure of claim 8 wherein the first material comprises a conducting oxide, a phase change material, a two-dimensional material, or an electro-optic polymer.

15. The structure of claim 8 wherein the second material comprises single-crystal silicon, and the third material comprises silicon nitride or polysilicon.

16. A structure for a polarization rotator, the structure comprising:
    a substrate;
    a first waveguide core over the substrate, the first waveguide core including a section;
    a second waveguide core over the substrate, the second waveguide core positioned proximate to the section of the first waveguide core; and
    a third waveguide core over the substrate, the third waveguide core positioned proximate to the first waveguide core and the second waveguide core,
    wherein the second waveguide core comprises a first material having a refractive index that is reversibly variable in response to a stimulus, the first waveguide core comprises a second material different from the first material, and the third waveguide core comprises a third material different from the first material and different from the second material.

17. The structure of claim 16 further comprising:
    a heater proximate to the second waveguide core, the heater configured to selectively transfer heat as the stimulus to the second waveguide core.

18. The structure of claim 16 wherein the first material comprises a conducting oxide, a phase change material, a two-dimensional material, or an electro-optic polymer.

19. The structure of claim 16 wherein the second material comprises single-crystal silicon, and the third material comprises silicon nitride.

20. The structure of claim 16 wherein the second material comprises single-crystal silicon, and the third material comprises polysilicon.

* * * * *